Feb. 19, 1952 A. W. WAY 2,586,447
APPARATUS FOR SEPARATING SOLIDS FROM A LIQUID BODY
Filed May 7, 1946 6 Sheets-Sheet 1
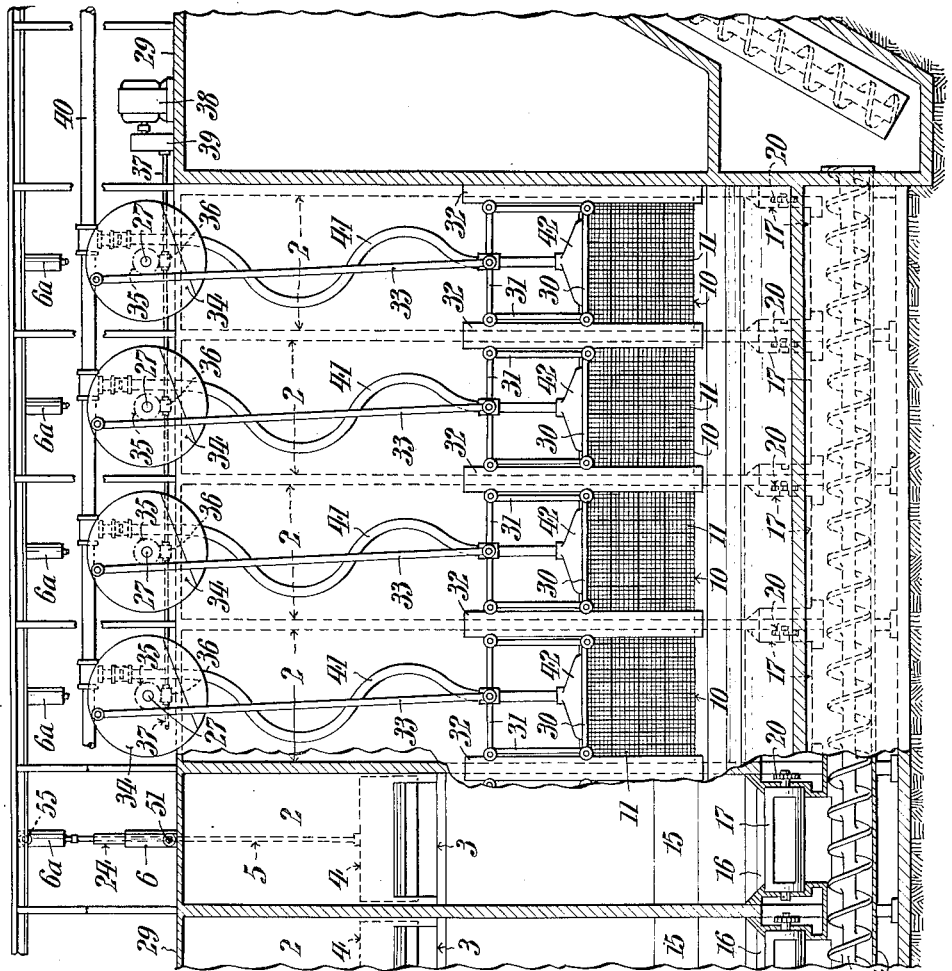
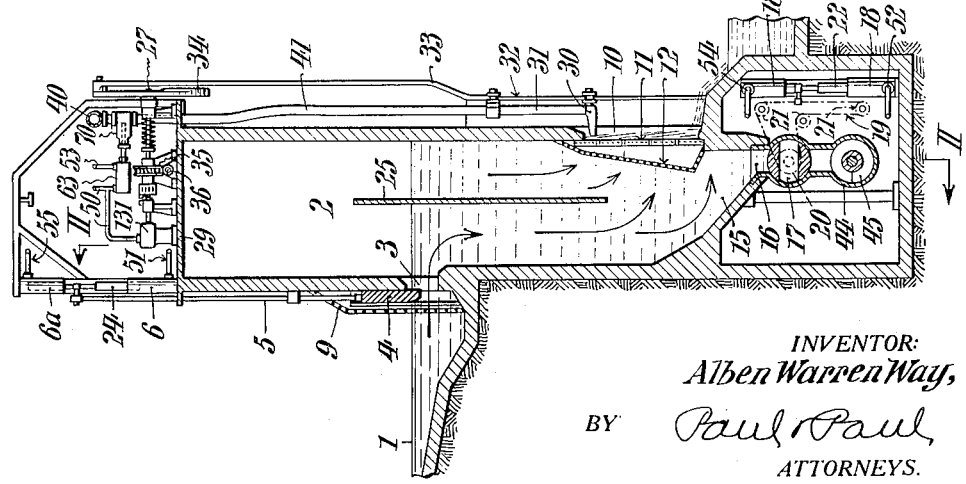
INVENTOR:
Alben Warren Way,
BY Paul & Paul,
ATTORNEYS.

Feb. 19, 1952 — A. W. WAY — 2,586,447
APPARATUS FOR SEPARATING SOLIDS FROM A LIQUID BODY
Filed May 7, 1946 — 6 Sheets-Sheet 2
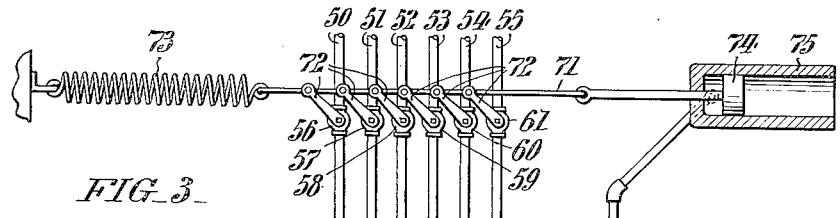
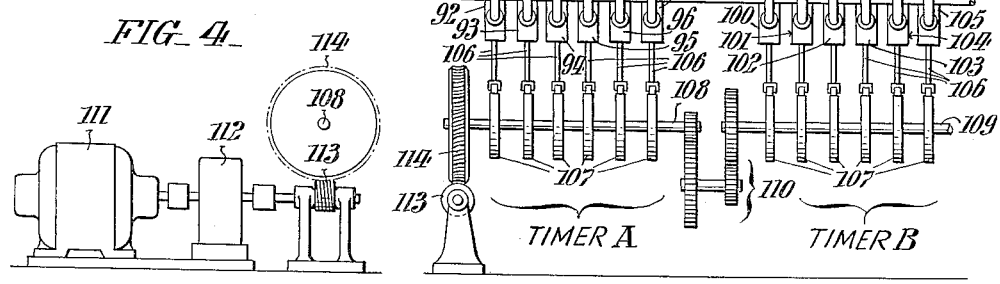
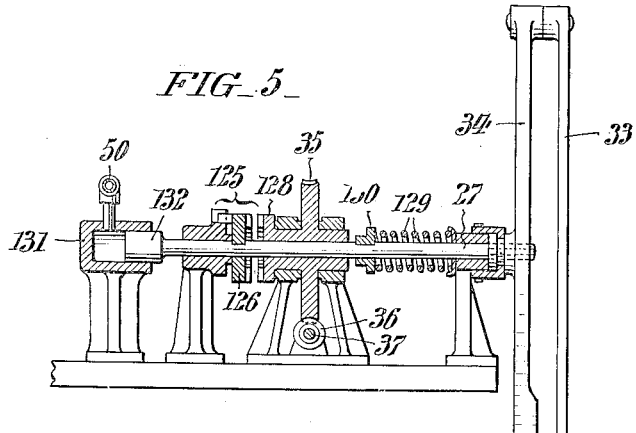
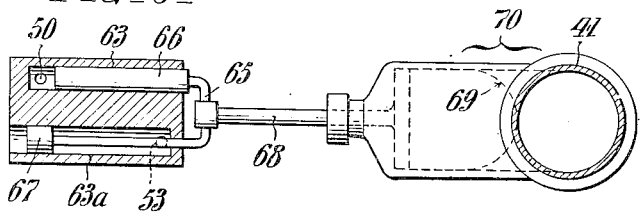
WITNESSES
Hubert Fuchs
Thomas W. Kerr, Jr.
INVENTOR:
Albert Warren Way,
BY Paul & Paul
ATTORNEYS.

Feb. 19, 1952 A. W. WAY 2,586,447
APPARATUS FOR SEPARATING SOLIDS FROM A LIQUID BODY
Filed May 7, 1946 6 Sheets-Sheet 3
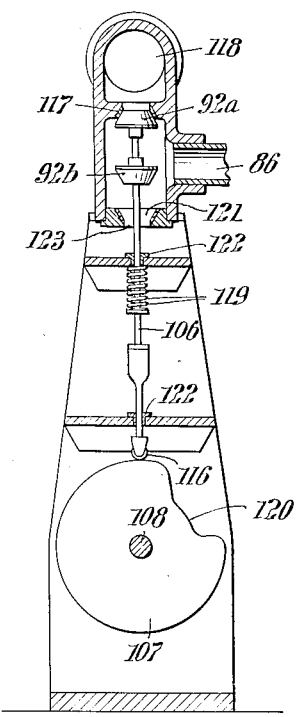
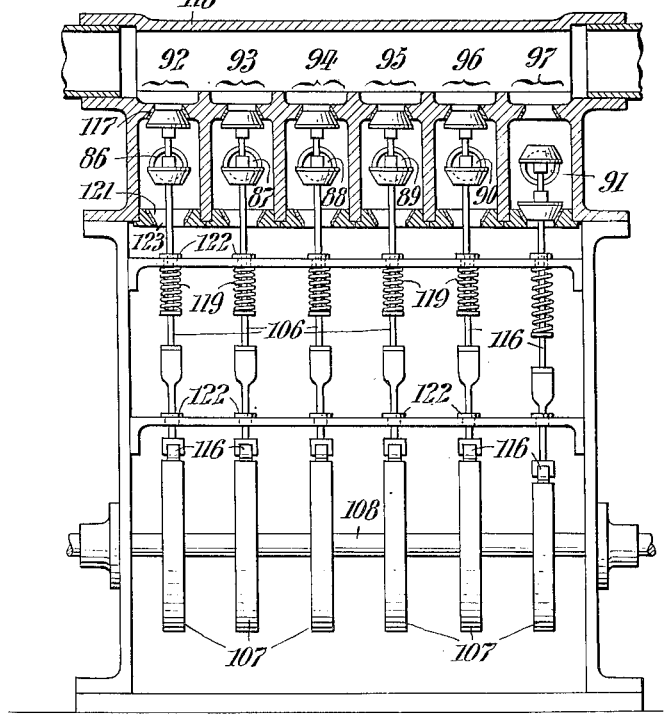
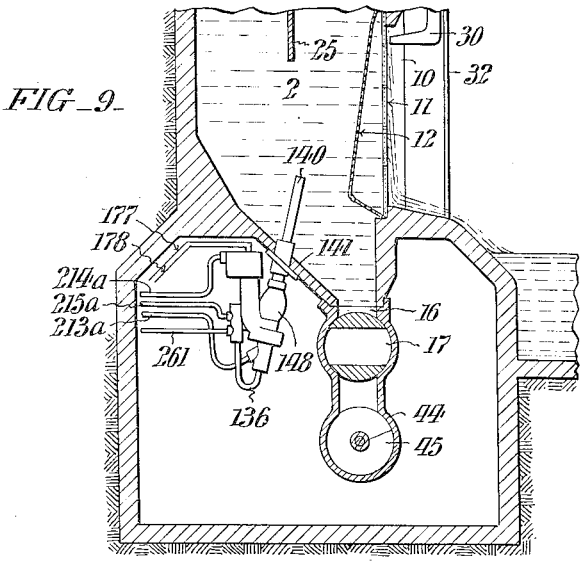
WITNESSES
Hubert Fuchs
Thomas W. Kerr, Jr.
INVENTOR:
Alben Warren Way,
BY Paul & Paul
ATTORNEYS.

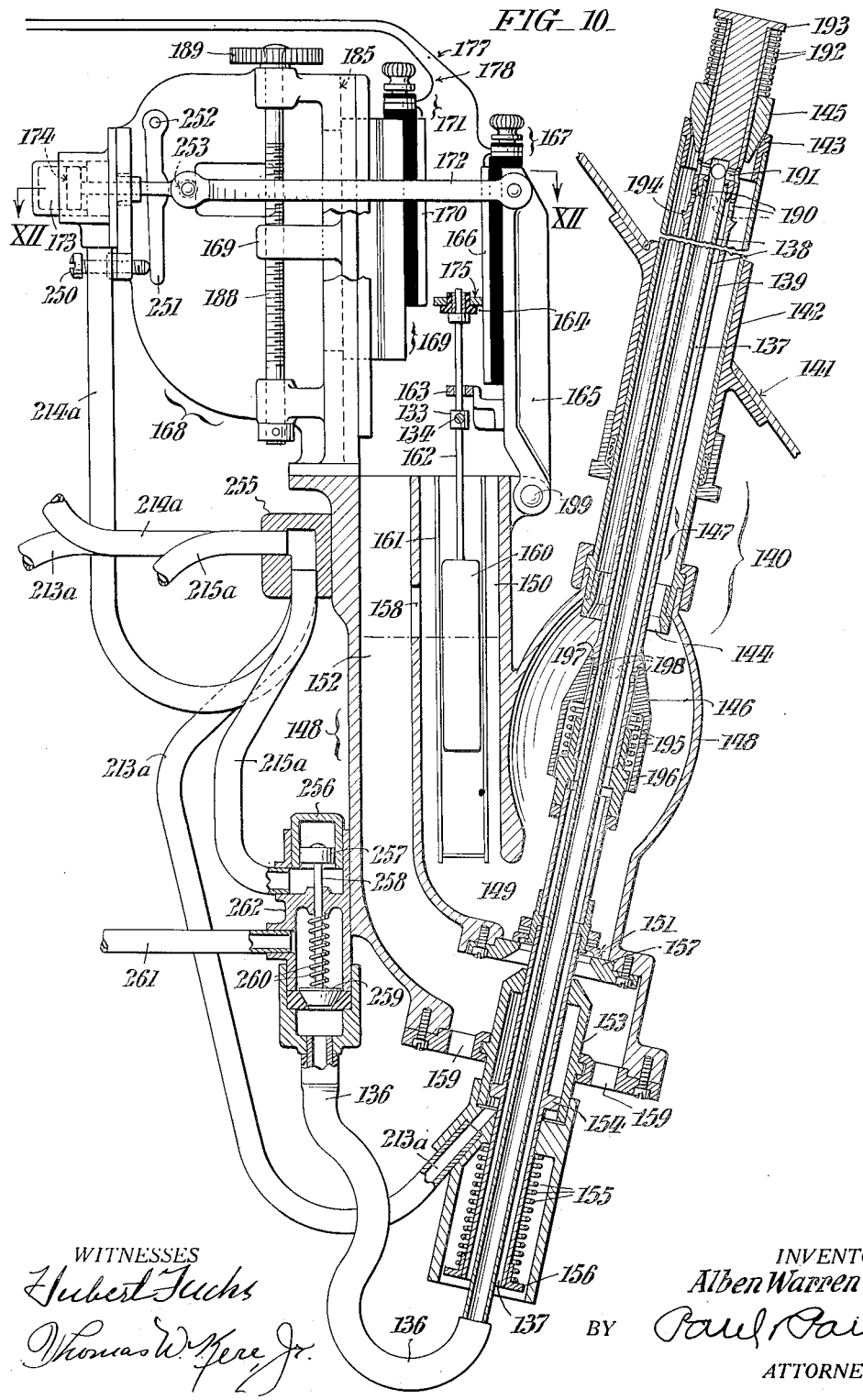

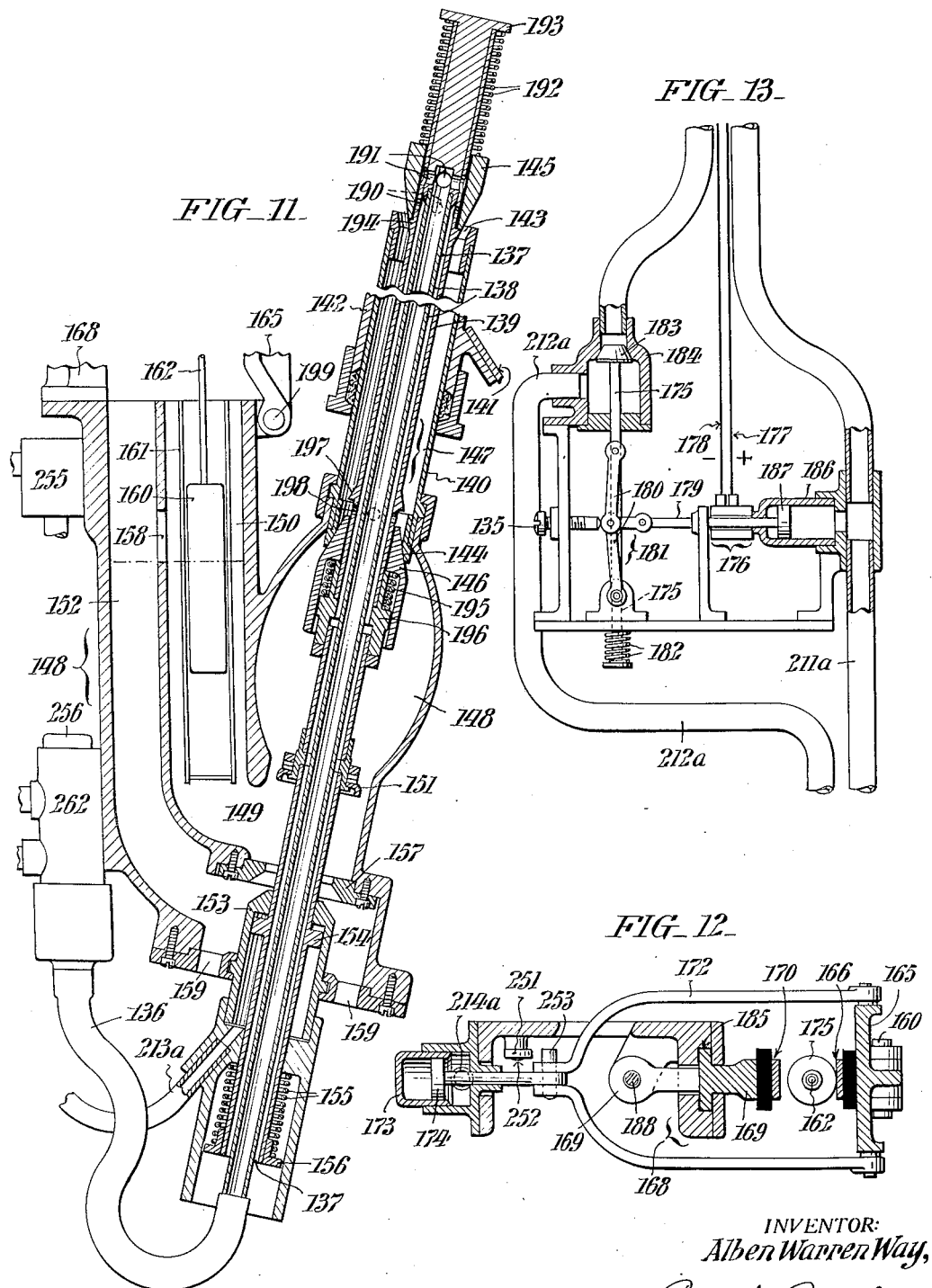

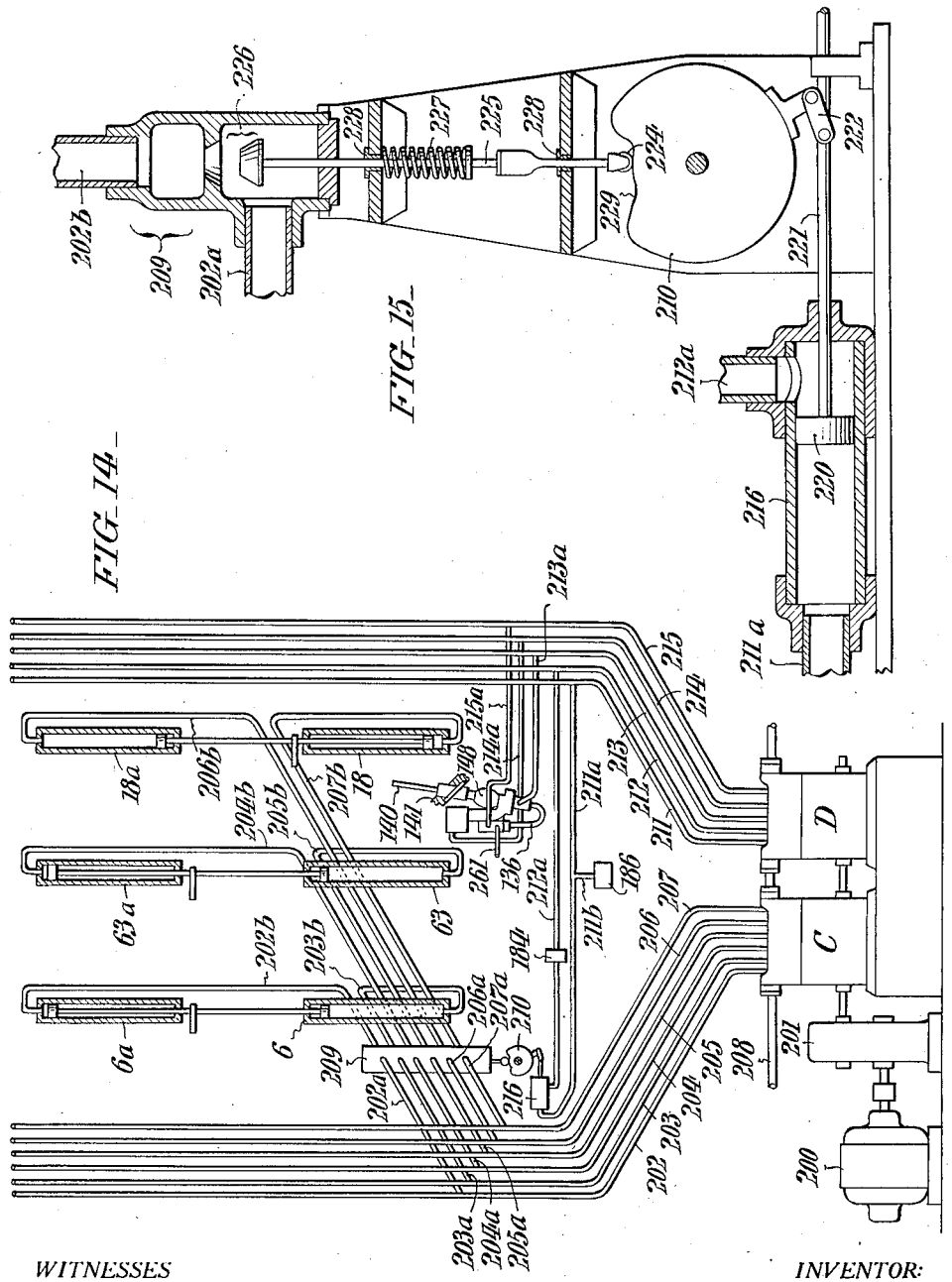

Patented Feb. 19, 1952

2,586,447

UNITED STATES PATENT OFFICE 2,586,447

APPARATUS FOR SEPARATING SOLIDS FROM A LIQUID BODY

Alben Warren Way, Philadelphia, Pa.

Application May 7, 1946, Serial No. 667,937

6 Claims. (Cl. 210—43)

This invention relates to apparatus for separating solids from a liquid body and is especially useful in its application to the removal of solid matter from flowing streams of water. In a previously filed application for Letters Patent, Serial No. 624,144, filed October 24, 1945, in the name of John William Morton and myself, there is disclosed and claimed a process of thickening concentrate derived from a solids-laden stream, and apparatus for carrying out the process. The present invention constitutes an improvement which pertains to the same field of invention, and in its broader aspects has useful application not only to the removal of solids from a natural solids-laden stream, but also from industrial plant waste discharge, from mine discharge, from dredge discharge and from various other sources.

Where the solids content of a flowing stream, for example, coal, silt, fines, or the refuse of industrial plant discharge is fairly constant, or varies within a narrow range, it is desirable to employ a process of separation using a "time cycle," either for automatic control or as a guide towards efficient manual control, so that the various operations involved may take place in proper sequence and at proper intervals predetermined according to the percentage of solids to liquid, or the range within which such percentage may vary.

On the other hand, where the solids content of a stream, or other source, varies greatly, it is desirable to employ a process using a "test cycle" in which frequent tests are performed to determine density, and the successive operations of the separating apparatus are gauged or timed according to the fluctuations in density which are periodically encountered.

Accordingly the object of the present invention is to provide apparatus which will meet the problems involved under either of the conditions mentioned above. More specifically, in the apparatus of this invention provision is made for effecting a series of mechanical movements to admit batches of a solids-laden liquid body to a thickening chamber wherein a concentrate is formed by gradual accretion of solids, to discharge such concentrate from the thickening chamber in successive batches, and to permit the outflow of liquid, substantially free of solids from said chamber, with such movements performed in the desired sequence and properly timed so as to maintain maximum efficiency and maximum production of concentrate.

In a variant form of the invention provision is also made for periodic testing of the density of the concentrate in the thickening chamber and for discharging each batch of concentrate when it has acquired a predetermined density.

The invention further comprehends various appliances which make possible a fully automatic control of all of the above mentioned mechanical movements involved in the separation process.

Other more specific objects and advantages characteristic of the present invention are set forth more fully in the description of certain practical embodiments of the invention which follows hereinafter and has reference to the accompanying drawings, whereof:

Fig. 1 is a vertical cross-sectional view of a thickening chamber and accompanying parts suitable for the practice of the invention according to the "time cycle" principle;

Fig. 2 is a rear elevation of a series of such thickening chambers, partly in section, as indicated by the arrows II—II in Fig. 1;

Fig. 3 is a diagrammatic representation of the timing mechanism and other apparatus used for remotely and automatically controlling the mechanical movements performed at each separating chamber;

Fig. 4 shows the motor and associated speed reducer and regulator for driving the timing mechanism;

Fig. 5 shows in detail, partly in elevation and partly in section, the apparatus for controlling vertical motion of each back washing nozzle;

Fig. 6 shows in detail the apparatus for controlling the supply of water to each back washing nozzle;

Figs. 7 and 8 show in cross section and in side elevation, partly in section, details of one of the timing devices shown in Fig. 3;

Fig. 9 is a vertical cross-sectional view of a portion of a thickening chamber and accompanying parts suitable for the practice of the invention according to the "test cycle" principle;

Fig. 10 shows in enlarged detail and in cross section the test tube, density testing chamber, and associated mechanism;

Fig. 11 is a view somewhat similar to Fig. 10 but shows the valves of the test tube in different positions;

Fig. 12 is a cross-sectional view of the same taken as indicated by the arrows XII—XII of Fig. 10;

Fig. 13 is a view of an electrically and pressure operated valve associated with the density testing apparatus;

Fig. 14 is a diagrammatic representation of the timing mechanism and other apparatus for remotely and automatically controlling the mechanical movements at each chamber according to the "test cycle" principle; and Fig. 15 shows in detail a pressure operated cam for controlling each of the manifolds shown in Fig. 14.

In the accompanying drawings, with special reference to Figs. 1 and 2, a body of solids-laden water is shown at 1. It may be assumed that the body of water is derived from a natural stream, or is discharged from an industrial plant, or comes from any other source. A thickening chamber is represented at 2. The solids-laden water enters the chamber 2 through an opening 3 in the region of its upper end, and discharges substantially free of solids through a screen 11 located near the bottom of the chamber. Admission of water into the chamber 2 is controlled by a gate 4 in the opening 3, which is moved up and down by a rod 5, the reciprocation of which is accomplished by a double piston 24 operated by opposed pressure cylinders 6, 6a controlled remotely and automatically as hereinafter described by pressure lines 51 and 55 which cause the gate 4 to be opened and closed at the proper time and for the desired intervals. As the capacity of the intake gate 4 is greater than that of the screen 11, the solids-laden liquid fills the chamber 2 to approximately the level of water in the entrance channel. To prevent the entrance into the chamber 2 of unduly large solids, a coarse screen 9 guards the inflow of the stream on the outside of the gate.

A frame for the screen 11 is formed at the outlet 10 of the chamber 2. It may be assumed that the screen 11 is so constructed that notwithstanding its fineness it is capable of resisting the pressure to which it is subjected. A protecting screen 12 of relatively coarse mesh is disposed at the inside of the settling chamber to prevent large solids from being carried against the fine screen 11. At its base the chamber 2 is desirably in the shape of a funnel forming a sump 15 having an exit 16 along its bottom controlled by a valve 17, the opening and closing of which is accomplished by opposed pressure cylinders 18, 18a having a double piston 22 attached to an endless chain 19, trained around idle sprockets 21 and also around a sprocket 20 which operates the valve 17. The pressure cylinders 18, 18a are operated automatically and by remote control, as hereinafter described, by pressure lines 52 and 54.

A baffle plate 25 is mounted more or less centrally in the thickening chamber 2. It extends downwardly far enough to prevent direct impact of the incoming stream against the filtering means at the outlet 10, and causes the flow to take a general horizontal direction as it approaches the outlet. On the outside of the outlet 10 there is a nozzle 30 extending across the width of the screen 11 and capable of projecting a jet of water under considerable pressure against the screen from the outside, the purpose of the jet being to keep the inner surface and meshes of the screen clean by forcing therefrom any accumulation of solid matter which may tend to clog the screen. The nozzle 30 is fixed on a framelike structure 31 guided for up and down movement by guides 32 on the rear wall of the chamber 2 and reciprocated by a crank disk 34 with which the structure 31 is connected by a rod 33. The shaft 27 of the crank disk 34 has a worm gear 35 driven by a worm 36 on a shaft 37. The shaft 37 is operated by a motor 38 through reduction gearing 39 located upon the working platform 29.

Each nozzle 30 is supplied by a water line 40 from which proceed branches, each having a flexible or extensible component 41 and a spreading end 42. Flow of water under pressure through the nozzles 30 is controlled remotely and automatically by mechanism which is hereinafter described.

Below the valve 17 which controls the bottom outlet 16 an elongated conduit 44 is provided within which operates a screw conveyor 45 which by continual rotation carries with it to a desired point of discharge all of the concentrate produced in and removed from the thickened chamber 2.

The description thus far has been directed to a single thickening chamber, but it is to be understood that it is generally desirable to provide a series of separate chambers placed in juxtaposition to each other and having their inlets and outlets at a common level. Mechanism for performing the various operations for opening and closing the intake gate 4, for effecting the vertical movement of the nozzles 30, for controlling the jet of water from the nozzles 30, and for opening and closing the valve 17 is duplicated at each chamber in the series.

As shown in Fig. 3 the means for controlling the various operations at each chamber 2 in the illustrated example of the invention constitute a number of pressure lines 50 to 55 leading to each instrumentality at the particular chamber the operation of which is to be controlled, the flow of pressure fluid at each chamber being governed by a corresponding number of shut-off valves 56 to 61.

Pressure lines 51 and 55 lead to the cylinders 6 and 6a respectively and control reciprocation of the double piston 24, shown in Figs. 1 and 2, which is connected to the rod 5 and which moves the intake gate 4 to open or closed position, depending upon whether pressure is applied to cylinder 6 or cylinder 6a.

Pressure lines 52 and 54 lead to the cylinders 18 and 18a respectively and control reciprocation of the double piston 22, shown in Fig. 1, which is connected to the endless chain 19 and which causes the discharge valve 17 to be opened or closed, depending upon whether pressure is applied to cylinder 18 or cylinder 18a.

Pressure lines 50 and 53 lead to cylinders 63 and 63a respectively, shown in Fig. 6, and control movement of a yoke 65 connected to piston 66 and 67 moving in cylinders 63 and 63a. The yoke 65 is in turn connected to a valve rod 68 which operates the gate 69 of a cut-off valve 70 controlling the supply of water to the hose 41 and thence to each nozzle 30.

In practice it is desirable to add to the control devices mentioned above certain safety features to insure against various failures or improper operation of the valves associated with the chamber 2 but such safety features form no part of the present invention and hence are not shown.

With further reference to Fig. 3, the shut-off valves 56 to 61 are simultaneously operated by means of a connecting rod 71 having links 72 leading to each such valve. It will be understood that all of the valves 56 to 61 are opened or closed together, and that whenever pressure is admitted to one cylinder, such as cylinder 6, its companion cylinder 6a is exhausted. Where air under pressure is used as the pressure medium such exhaust may be to the atmosphere. A spring 73 urges movement of the connecting rod 71 to the left as viewed in Fig. 3. A piston 74 movable within a cylinder 75 urges the connecting rod 71 in the opposite direction when pressure is admitted to the cylinder 75 through pipe 80. Desirably the shut-off valves 56 and 61 are located near the chamber the functions of which they control, and in close proximity to each other. They may be situated at the working platform 29. Although only one set of shut-off valves has been shown in the drawings, this set consisting of six valves associated with one chamber, it will be understood that a similar set of valves will be provided for each thickening chamber 2 that is employed. Upon the assumption that six chambers constitute a convenient number for a section of a separating plant, six connections are illustrated at 80 to 85, but only the apparatus associated with one connection, that shown at 80, is illustrated in the drawings.

The flow of pressure fluid to shut-off valves 56 to 61 through pipes 86 to 91 is controlled by timing valves 92 to 97. Similarly the flow of pressure fluid through pipes 80 to 85 is controlled by timing valves 100 to 105. Each timing valve 92–97, 100–105 is connected to a source of pressure and has a valve rod 106 governing opening or closure actuated by a cam 107.

One group of six cams 107 is mounted upon a shaft 108 which is caused to revolve at a constant speed, and the other group of six cams is mounted upon an additional shaft 109 connected to shaft 108 by reduction gearing 110. As shown in Fig. 4 shafts 108, 109 are driven by a constant speed electric motor 111 through a speed change and regulating mechanism 112, a worm 113 and a worm gear 114 mounted upon shaft 108. Each cam 107 may take a form such as illustrated in Fig. 7. When the roller 116, see Figs. 7 and 8, at the lower end of the valve rod 106 engages the raised cylindrical surface of the cam disc 107 the timing valve 92a is maintained in the raised position against valve seat 117 shutting off the flow of pressure fluid from pipe 118, which leads to the source of pressure, to pipe 86. On the other hand, when the roller 116, urged downward by a spring 119 and guided by sleeves 122, engages the depressed surface 120 of cam 107, valve 92a is withdrawn from valve seat 117 and valve 92b is lodged against valve seat 121. Flow is then permitted from pipe 118 to pipe 86. Valve 92b when raised from its seat 121 permits an exhaust from pipe 86 to the atmosphere through port 123. The set of six cams 107 mounted on shaft 109 is preferably caused to rotate at one-sixth of the speed of rotation of shaft 108, this being accomplished by use of reduction gearing establishing a 6 to 1 ratio between shafts 108 and 109. The shaft 108 and the cams 107 associated therewith are comprehensively designated as timer A and the slower moving shaft 109 and associated cams are designated as timer B. If it be assumed that timer A operates at a speed of one revoultion in five minutes and timer B operates at a speed of one revolution in thirty minutes, it will be apparent that the cams may be so constructed and arranged with respect to each other that the sequence of operations at each chamber may be staggered at five minute intervals so that when any one chamber is discharging its concentrate with its intake gate 4 closed, the five other chambers of the section will be actively accumulating solids by the thickening process. It will also be apparent that the cams 107 of timer A are so arranged and constructed that when one cylinder of a pair, such as cylinder 6, is under pressure the opposed cylinder 6a will exhaust to the atmosphere.

In Fig. 5 there is shown a device for effecting intermittent movement of the back washing nozzles 30 so that reciprocation of each nozzle is suspended during the period in which the water supply to the nozzle is cut off. This apparatus comprises a clutch 125 having one element 126 keyed to the shaft 27 which drives the crank disc 34 and having a clutch face 128 affixed to the driven worm gear 35 which is mounted to turn freely upon the shaft 27. The clutch 125 is normally disengaged and held out of action by a spring 129 bearing against a collar 130 keyed to shaft 27, but when water is turned on at the nozzle 30 pressure from line 50, which is the control line governing water supply to the nozzle, is admitted to a cylinder 131. Shaft 27 has an enlarged end 132 fitting within cylinder 131 and serving as a piston. Accordingly under the influence of pressure within the cylinder 131 shaft 27 moves to the right, as viewed in Fig. 5, causing clutch element 126 to engage clutch face 128 so that shaft 27 is caused to rotate. When pressure in the cylinder 131 is relieved the clutch 125 will be disengaged under the influence of spring 129 and rotary movement of the crank disc 34 will cease.

In the second form of my invention illustrated in Figs. 9 to 15 there is shown apparatus designed to meet the special problems involved where the supply of solids-laden water varies greatly as to the solids content. Such apparatus I conveniently term "test cycle" apparatus. In this form of the invention each chamber 2 may be considered to involve all of the apparatus hereinbefore described but to include additionally a test tube 140 fitted into the side of the thickening cup 141 of the chamber in a nearly vertical position, as shown in Fig. 9, with its upper end extending into the cup to a point where it is desirable to secure the material to be tested, which in most cases is well towards the center of the cup. As depicted in Fig. 10, the tube 140 is carefully fitted to the side of the cup 141 and made water tight by a stuffing box 142.

Valve seats 143 and 144 are provided at each end of the tube 140 and the corresponding valves 145 and 146 are mounted on a valve stem 147, which comprises inner and outer concentric tubes 138 and 139 extending throughout the entire length of the test tube 140 and for some distance below its lower end.

To the bottom of the test tube 140 is fitted a casting 148, somewhat in the shape of a smoker's pipe, and designed to permit free flow from the test tube 140 into the bowl 149 and from thence into the upright vertical section 150, which constitutes a testing receptacle. A valve 151 is provided at the lower end of casting 148 directly in line with the valves 145 and 146. An overflow receptacle 152 is formed adjacent to the testing receptacle 150 and is preferably an integral part of the same casting 148. An opening 158 leads from the testing receptacle 150 to the overflow receptacle 152. Below the lower valve 151 there is a cylinder 153 operated in its upward motion by pressure fluid supplied from a pipe 213a, and its downward motion by a spring 155. The spring 155 bears against the flange of a collar 156 mounted on the valve stem 147, and tends to move the stem downwardly. When pressure is admitted at pipe 213a it exerts a force upon a piston 154 mounted on the valve stem 147 and moves the stem upwardly.

In operation the valve stem 147 has two positions. When at rest or in its lowered position, see Fig. 10, the valve stem 147 maintains valve 145 closed against its seat 143 and valve 151 closed against its seat 157 whereas valve 146 is open. When a test is made, valve stem 147 is raised by pressure in cylinder 153, opening valves 145 and 151 and closing valve 146, as shown in Fig. 11. A charge or sample is then admitted from the thickening cup 141 into the test tube 140, such sample consisting of a definite quantity of concentrate. At the same time, valve 151 being opened, any old test material remaining in the bowl 149 is allowed to flow away through discharge ports 159 at the base of casting 148. When pressure is relieved in cylinder 153, the spring 155 pushes valve stem 147 downwardly closing valves 145 and 151 and preventing more material from entering the test tube 140, also opening valve 146 and allowing the sample to flow into bowl 149. The sample flows upwardly into the testing receptacle 150 filling that receptacle to the level of the opening 158 with any excess overflowing into the overflow receptacle 152, thereby establishing a definite level for the sample being tested.

In order to prevent air locking of the test tube 140 vents 190, 198 are provided leading from the interior of the test tube 140 to the annular space 137 between the concentric tubes 138, 139. One such vent 190 consisting of a number of ports is disposed at the upper end of the tubular stem 147. When the tubular stem 147 is in its raised position valve 145 slides downwardly on the stem 147 under the force of a spring 192 which bears against the flanged end of a plug 193 secured within the upper end of the tubular stem 147. Such movement is sufficient to cover vent 190, but is limited by an abutment 194 formed on the tubular stem 147 immediately beneath vent 190. When the tubular stem 147 is lowered vent 190 is uncovered. Similarly valve 146 has a spring 195 associated therewith bearing against a collar 196 fixed on the tubular stem 147 in such manner that in the lowered position of the stem 147 valve 146 engages abutment 197 and covers vent 198, and in the raised position, shown in Fig. 11, upon seating of the valve 146, this vent 198 is uncovered. An additional vent 191 is provided near the top of valve stem 147 and in a position where it is covered and uncovered by movement of valve 145, this vent 191 leading from the interior of the test tube 140 to the inside of the inner tube 138. At the lower end of the innermost tube 138 a flexible hose 136 is attached to the tube to admit water under pressure which is used for periodic cleaning of the test tube 140 by admission through vent 191.

In the testing receptacle 150 there is a float 160 held in a central position by means of a wire cage 161. As the sample assumes a fixed position or level, the float 160 also assumes a fixed position, depending upon the density of the sample being tested.

As shown in Fig. 10 the float 160 has a light rod 162 extending above it and traveling up or down with it while being maintained in a vertical position by a loose fitting bearing 163. At the top of the rod 162 is a washer 164 of insulating material and above it a metal ring 175 insulated from the rod 162. To the top of casting 148 is hinged at 199 an arm 165 on the front of which is a metal plate 166 insulated from the arm 165 and so located that it lightly touches the metal ring 175 at the top of rod 162. Metal plate 166 is connected electrically to an electric terminal 167. To the top of the opposite side of casting 148 is firmly secured a second casting 168 having an adjustable vertically sliding fixture 169 fitted with a metal plate 170 insulated from the body of the sliding fixture 169. Metal plate 170 is also connected to a second electrical terminal 171. Adjustment of the vertical position of the sliding fixture 169 with respect to its guiding element 185 is accomplished by a threaded shaft 188 turned by a hand wheel 189. Metal plate 170 is laterally displaced from the metal ring 175 on rod 162 and the position of the bottom edge of plate 170 determines the point to which rod 162 must be raised to effect an electrical contact.

To the hinged arm 165 there is attached a U-shaped arm 172 connected to a piston 174 within a cylinder 173, the piston 174 having a short stroke, the limit of travel being controlled by an adjusting screw 250 which bears against one end of an arm 251 pivoted at 252 and adapted to strike an abutment 253 on the U-shaped arm 172.

Material from the thickening cup 141 flows into the bowl 149, establishes a level in the testing receptacle 150, and causes the float 160 to come to rest at a fixed level. Pressure admitted to cylinder 173 draws arm 165 to the left, as viewed in Fig. 10, pressing metal ring 175 at the top of rod 162 towards metal plate 170. The adjustment of the parts is such that the lower end of plate 170 is just low enough relative to stop rod 162 to establish an electrical contact between terminals 167 and 171 when the sample has acquired a predetermined density. By the described construction the float 160 and rod 162 are free to move up and down without appreciable friction. In order to prevent any excessive up-surge of float 160 when the sample is first introduced into the testing receptacle 150, a collar 133, adjustable by means of a set screw 134, is mounted on rod 162, and by engagement with bearing 163 limits upward movement of rod 162 under such conditions.

Also mounted on casting 148 is a fixture 255 with three pipes 213a, 214a and 215a carried by it, these pipes leading from a timing device hereinafter described. Pipe 213a leads to the cylinder 153 which operates the valve stem 147 in test tube 140. Pipe 214a leads to cylinder 173 which operates the swinging arm 165. Pipe 215a leads to a cylinder 256 having a piston 257 connected to a valve rod 258 operating a valve 259. Valve rod 258 and valve 259 are normally maintained in a lowered position by means of a spring 260. A pipe 261 leads from a source of water under pressure to the side of valve chamber 262. When the piston 257 is actuated by admission of a pressure fluid to cylinder 256 valve 259 is raised allowing water under pressure to flow from pipe 261 to flexible hose 136 leading to the inside of the inner tube 138 of valve stem 147. At the start of each new test a charge of clear water is admitted to the test tube 140 through vent 191 to wash the tube as well as the bowl 149 and testing receptacle 150.

The effect of making a contact between terminals 167 and 171 is to energize a magnet 176, see Fig. 13, through wires 177 and 178, drawing a rod 179 to the right, as viewed in Fig. 13, and throwing the vertical arms 180 of a toggle 181 off center allowing a spring 182 acting upon a valve rod 175 to open a valve 183 in chamber 184 so that impulses derived from a timing device hereinafter described cause a flow of pressure fluid through pipe 212a and set in motion a sequence of operations at the chamber under test commencing with the discharge of concentrate therefrom. At the proper point pressure impulses admitted to a cylinder 186 cause a movement of piston 187 connected to rod 179 forcing the rod 179 to the left and closing valve 183 by resetting the arms 180 of toggle 181. An adjusting screw 135 regulates the stroke of piston 187. When the toggle 181 has been reset and the parts are in the position represented in Fig. 13 further impulses admitted at cylinder 186 will have no effect upon valve 183. Such impulses will only cause a movement of piston 187 after magnet 176 has been energized.

In Fig. 14 the timing devices for control by "test cycle" are illustrated. Timer C may be assumed to be in all respects similar to timer A of the "time cycle" control mechanism previously described. Timer D may also be assumed to be similar to timer B previously described except that it is driven at the same speed as timer C and comprehends only five cams in this particular example of the invention. Timer C and D are driven by a motor 200 through a speed reducer and regulator 201.

Pipes 202 to 207 lead from the timing valves of timer C past all the separating chambers of the plant with branches 202a to 207a to each chamber 2 which perform the same functions in the same manner as the pipes 86 to 91 previously described in connection with timer A except each branch pipe 202a to 207a leads through a manifold 209 and thence to cylinders 6, 6a, 18, 18a, 63 and 63a, such manifold 209 being controlled by a single cylindrical cam 210 and associated mechanism as shown in detail in Fig. 15. The source of pressure fluid to timers C and D is a pipe indicated at 208.

Pipes 211 to 215 lead from the timing valves of timer D past all of the separating chambers of the plant with branches 211a to 215a to each chamber. More specifically, pipe 211a leads to one end of a cylinder 216, shown in Fig. 15, and governs the opening of the series of valves in manifold 209 whereas pipe 212a leads to the other end of cylinder 216 and under certain conditions governs closure of manifold 209. The piston 220 within cylinder 216 is connected by a rod 221 with a link 222 attached to a cylindrical cam 210. Cam 210 engages rollers 224 on the lower ends of valve rods 225 and simultaneously operates the entire series of valves 226 within manifold 209. Each valve rod 225 is urged downwardly by a spring 227 and is guided within bearings 228. In an obvious manner when the rollers 224 engage the depressed surface 229 of cam 210 all of the six valves 226 within manifold 209 will be caused to open simultaneously permitting flow through pipes 202a to 207a to pipes 202b to 207b which lead to cylinders 6, 6a, 18, 18a, 63, 63a and control the mechanical movements of the intake gate 4, the discharge valve 17 and the back washing nozzles 30, as well as the supply of water to the nozzles 30, all as previously described.

With further reference to the pipes 211 to 215 leading from timer D it will be noted that branch pipe 211a has a branch 211b which leads to cylinder 186 whereas branch pipe 212a leads through chamber 184 and its valve 183 (Fig. 13). Branch pipes 213a, 214a and 215a lead to the density testing apparatus as previously described.

Desirably the manifolds 209 and mechanism illustrated in Fig. 15 are located at the level of the working platform 29 above the chambers 2, and hence pipes 211 and 212 are run from the control station where timer D is located to the overhead platform of the separating plant, with their branches 211a to 212a leading to positions above each chamber of the plant. On the other hand pipes 213, 214 and 215 are preferably disposed at a lower level beneath the chambers 2 with their branches 213a to 215a leading directly to the density testing apparatus at each chamber.

Operation of the density testing apparatus is as follows. Upon the assumption that the valves 145 and 151 are open and that valve 146 is closed spring 195 is compressed and vent 190 is uncovered releasing any back pressure or air locked in the test tube 140. Trapped air will flow out through vent 190 and the annular space 137 between concentric tubes 138 and 139 to the atmosphere. Upon the next actuation of valve stem 147 with the closing of valves 145 and 151 and the opening of valve 146 the sample in the test tube 140 will flow downwardly through valve 146 and around into the testing receptacle 150. Air will then flow into the upper part of the test tube 140 through vent 190 again preventing an air lock. After a test of the sample has been made in the testing receptacle 150, valve 259 will be opened and clear water delivered through flexible hose 136 into the inner tube 138 and from thence through vent 190 into the body of test tube 140. Prior to the next test with the raising of valve stem 147 valve 151 will be opened emptying all old material from the previous test, as well as washing water, through the ports 159 at the base of casting 148.

At any chamber 2 of the plant during the period while the concentrate forming in the thickening cup 141 has not reached a sufficient density so that tests of samples produce electrical contact between terminals 167 and 171 of the density testing apparatus the magnet 176, shown in Fig. 13, will be de-energized and the valve 183 will be held closed by spring 182. Under these conditions there can be no flow of pressure fluid to manifold 209 through pipe 212a and all of the valves 226 of the manifold will be held closed so that impulses received at manifold 209 from timer C will have no effect with the result that the separating process will continue at the chamber from which such tests have been made with negative results. On the other hand, when the density of the sample concentrate reaches a predetermined value and a positive result is obtained establishing an electrical contact between terminals 167 and 171, magnet 176 will be energized and valve 183 will be opened. Under these conditions impulses received at manifold 209 through pipe 212a will cause all of the valves 226 of that manifold to open, and thereafter under the influence of impulses from timer C the intake gate 4 will be closed, discharge valve 17 will be opened and the movement of nozzles 30, as well as the supply of water thereto, suspended. After the discharge of concentrate from the chamber 2 through valve 17, the testing receptacle having been emptied of its contents, contact between terminals 167 and 171 will be broken and magnet 176 de-energized. The next impulse received in cylinder 186 through pipe 211a will cause the toggle 181 to be reset and valve 183 to be closed. The impulse from pipe 211a will also close all of the valves 226 of manifold 209 so that the cycle is ready to be repeated.

While I have described my invention in considerable detail showing two specific embodiments and the particular mechanism for controlling all of the operations at a separating chamber, it will be apparent that numerous changes may be made in the form of the apparatus herein described and illustrated, and that certain features of the invention may at times be used to advantage without a corresponding use of other features, all without departing from the spirit of the invention as defined in the annexed claims. It should also be understood that although the apparatus of this invention is referred to as "apparatus for separating solids from a liquid,"

I do not wish to imply that the concentrate as discharged from the thickening chamber is free of liquid, but rather that the ratio of liquids to solids therein has been reduced to the point where the solid matter is readily recoverable.

Having thus described my invention, I claim:

1. In apparatus for separating solids from a liquid, including a screened retention chamber having a region wherein a substantially homogeneous concentrate is formed by gradual accumulation of said finely divided solids, said chamber having an outlet opening for the discharge of screened liquid and also having another outlet opening for said homogeneous concentrate, a conduit penetrating said chamber having means for effecting periodic withdrawals of samples of the concentrate from said region of said chamber to an exterior fluid receptacle, testing means in said receptacle for testing the density of the samples thus withdrawn, and flow controlling means connected to the concentrate outlet opening and responsive to the action of the density testing means for opening the concentrate outlet opening and thereby automatically discharging the entire content of the chamber when the concentrate therein has acquired a predetermined density.

2. In apparatus for separating solids from a liquid, a screened retention chamber having a region wherein substantially homogeneous concentrate is formed by gradual accumulation of said finely divided solids, said chamber having a liquid inlet opening and also having an outlet opening for the discharge of screened liquid, another outlet opening for said concentrate, a sampling conduit penetrating said chamber having means for effecting periodic withdrawals of concentrate samples from said region of said chamber to an exterior receptacle, float means in said receptacle for testing the density of the samples thus withdrawn, and flow controlling means connected to the concentrate outlet opening and liquid inlet opening and responsive to the density testing means for automatically discharging the entire content of said chamber and subsequently admitting a second batch of solids-laden liquid when the concentrate therein has acquired a predetermined density.

3. In apparatus for separating solids from a liquid including a chamber wherein a concentrate is formed by gradual accretion of solids and having a concentrate discharge conduit and a screened outlet for discharge of liquid, a sample conduit penetrating said chamber, timer-actuated valve means opening and closing said sample conduit for effecting periodic withdrawals of samples of the concentrate, each of a measured quantity, from said chamber to an exterior receptacle, float means in said receptacle for measuring the density of the sample, and flow controlling means for opening and closing the concentrate discharge conduit, said flow controlling means being actuated in response to the movement of the float means and effective to discharge the concentrate from said chamber when it has acquired a predetermined density.

4. In apparatus for separating solids from a liquid including a chamber wherein a concentrate is formed by gradual accretion of solids, said chamber having an inlet, a concentrate discharge conduit and a screened outlet for discharge of liquid, a sample conduit penetrating said chamber, valve means in said conduit for effecting periodic withdrawal of concentrate samples from said chamber, a timing device operatively connected to said valve means for controlling the periodic movement thereof, a test receptacle for the samples thus withdrawn, float means in said test receptacle for measuring the densities of the samples, mechanical means for opening and closing off the concentrate discharge conduit, and an electric circuit including a switch having a contact movable in response to the movement of said float means to make and break the circuit, said circuit also being operatively connected to said mechanical means and effective for opening and closing the concentrate discharge conduit in response to the movement of said float means.

5. In apparatus for separating finely devided solids from a liquid body including a chamber into which the solids-laden liquid is admitted in successive batches and wherein a concentrate is formed by accretion of solids, said chamber having a screened outlet for discharge of clear liquid, density testing apparatus including a conduit having means for withdrawing samples from the chamber at regular timed intervals and a receptacle having float means for determining the density of the samples withdrawn, mechanical flow interrupting devices coacting with the density testing apparatus for automatically shutting off the admission of liquid into the chamber and discharging the concentrate therefrom when a test of the sample indicates that its density has reached a specific value, and for continued operation independently of the action of the float means when a test of a sample indicates that its density is below said specific value.

6. In apparatus for separating finely divided solids from a liquid body including a series of chambers into which the solids-laden liquid is admitted in successive batches and wherein a substantially homogeneous concentrate is formed by accretion of solids, said chambers having screened outlets for discharge of liquid, float means for independently testing the density of samples of the concentrate from each individual chamber of the series, and valve means operatively connected to said float means for automatically and independently shutting off the admission of liquid into any chamber and discharging the concentrate therefrom when a test of a sample therefrom indicates that its density has reached a specific definite value.

ALBEN WARREN WAY.

REFERENCES CITED

The following references are of record in the file of this patent:

UNITED STATES PATENTS

| Number | Name | Date |
|---|---|---|
| Re. 21,741 | Samiran | Mar. 4, 1941 |
| 368,544 | Morrison | Aug. 16, 1887 |
| 952,620 | Keyes | Mar. 22, 1910 |
| 1,071,784 | Nutter | Sept. 2, 1913 |
| 1,140,131 | Dorr | May 18, 1915 |
| 1,454,756 | Mennell | May 8, 1923 |
| 1,471,342 | Logan | Oct. 23, 1923 |
| 1,530,836 | Kuzilik | Mar. 24, 1925 |
| 1,908,691 | Coe | May 16, 1933 |
| 1,957,898 | Mitchell | May 8, 1934 |
| 1,979,169 | Mitchell | Oct. 30, 1934 |
| 2,295,366 | Stout | Sept. 8, 1942 |
| 2,317,847 | Duden | Apr. 27, 1943 |
| 2,324,637 | Moor | July 20, 1943 |
| 2,454,653 | Kamp | Nov. 23, 1948 |